United States Patent [19]

Scott et al.

[11] 3,937,667

[45] Feb. 10, 1976

[54] PROCESSES FOR SEPARATING METALS

[75] Inventors: Kenneth Thomas Bartlett Scott, Reading; John Herbert Grimes; Peter William Ball, both of Basingstoke, all of England

[73] Assignee: United Kingdom Atomic Energy Authority, London, England

[22] Filed: Dec. 4, 1970

[21] Appl. No.: 95,371

[30] Foreign Application Priority Data

Dec. 15, 1969 United Kingdom............... 61087/69

[52] U.S. Cl. ...... 252/301.1 S; 252/317; 260/270 R; 260/429.1; 260/439 R; 260/429 J; 260/438.1; 264/0.5; 423/8; 423/15; 423/32; 423/81; 423/139; 423/144; 423/157

[51] Int. Cl.$^2$....................... B01J 13/00; C09K 3/00

[58] Field of Search.......... 23/24 R, 24 Z, 145, 147, 23/183, 186, 200, 305, 329, 332, 333; 252/301.1 S, 313 R, 317; 423/8, 15, 32, 81, 139, 144, 157

[56] References Cited

UNITED STATES PATENTS

| | | | |
|---|---|---|---|
| 2,727,806 | 12/1955 | Forward et al. | 23/333 |
| 2,860,949 | 11/1958 | Beaufait, Jr. et al. | 23/329 |
| 2,879,137 | 3/1959 | Bare et al. | 23/183 |
| 3,495,954 | 2/1970 | Grimes et al. | 23/333 X |

*Primary Examiner*—Leland A. Sebastian
*Attorney, Agent, or Firm*—Larson, Taylor and Hinds

[57] ABSTRACT

In conventional processes for separating metals by selective precipitation, the precipitate is frequently in an amorphous form, eg a slime, which is difficult to filter, wash and handle generally. In the present process mixed solutions and/or sols of the metals are mixed with a suitable soluble organic polymer to form a viscous mixture. The latter is formed into discrete entities, e.g. drops, which are contacted with a reagent which converts each drop to a gelled entity containing at least one of the metals as a precipitate.

In one form of the process, the same chemical reagent also serves to dissolve the other metal present in the initial drops. The metals are then easily separated by separating the gelled drops from the reagent. In another form, the reagent includes two different chemical reagents which contact the drop simultaneously, one to precipitate one metal in the gelled drops and the other to dissolve the other metal. In a variant of the latter form, the two reagents contact the drops consecutively, the first precipitating both metals in the gelled drops, and the second dissolving one metal out of the gelled drops.

22 Claims, No Drawings

3,937,667

PROCESSES FOR SEPARATING METALS

BACKGROUND TO THE INVENTION

This invention relates to processes for separating metals from mixtures thereof.

It is known to separate one metal from a mixture of two or more present in an aqueous medium, eg as soluble salts, by contacting the mixture with a chemical reagent which precipitates the metal of the one salt as an insoluble compound while maintaining the others in a dissolved condition or redissolving any precipitate thereof in an excess of the reagent. However the precipitates formed in such processes are usually amorphous in physical form, eg slimes, which are difficult to separate from the liquid, e.g., by filtration, and subsequently to wash and handle if desired.

The present invention provides a separation process in which the precipitated compound is formed as discrete, separable entities, eg., spherical or irregular particles, but permeable by chemical species in liquid media. The existence of the precipitate in this form and with these properties greatly alleviates the aforementioned difficulties.

SUMMARY OF THE INVENTION

According to the present invention a process for separating a metal from a mixture including said metal and at least one further metal comprises:

forming a viscous mixture of a water-soluble polymeric organic compound with an aqueous medium containing said metals, said metal-containing medium being selected from the group consisting of a mixed solution of salts of said metals, a mixture of hydrous sols of said metals, and a mixture of a solution of a salt of one said metal with a hydrous sol of the other said metal;

forming said viscous mixture into discrete entities of selected physical configuration;

contacting said entities with chemical reagent means capable of precipitating at least one said metal as an insoluble compound whereby each entity is converted to a gel containing said compound;

said reagent means being also capable of dissolving at least one other said metal;

and physically separating said gelled entities from said reagent means.

In one form of the process, the reagent means comprises a single chemical reagent which is capable both of precipitating one metal and dissolving the other.

The entities may be formed as drops, or as droplets produced by spraying. The drops or droplets may be introduced into the single reagent to form gel spheres or irregular gravel containing the precipitated metal and which are readily separated from the reagent as by filtering or decanting. As the separation is believed to be largely effected by subsequent diffusion of the reagent into the gel spheres or gravel, the latter are desirably made small in order to increase the speed of extraction.

A further degree of separation can be achieved by re-dissolving the gel spheres or gravel, eg in acid solution, optionally adding more of the organic compound, and again contacting the mixture, e.g., as drops, with the reagent.

The reagent may be alkaline. Where one metal forms an insoluble hydroxide and the other a soluble ammine, the reagent may be ammonium hydroxide solution.

Other solvents which form soluble metal co-ordination compounds, including chelate rings, can also be used. There is a wide range of both inorganic species (e.g., hydroxides, carbonates, sulphides, ammonia) and organic species (e.g., carboxylates, ammines, aminocarboxylates) which have this co-ordinating property.

When the polymeric organic compound is added to mixed solution of the salts of the two metals, it is preferably one having a plurality of hydroxyl groups, is other than a cellulosic derivative which increases in viscosity in the presence of an alkaline solution, and forms a complex with at least one of the two metal ions of the mixed solution. Suitable compounds for this purpose are disclosed in UK Specification No. 1,175,834 (U.S. Pat. No. 3,495,954), and include dextran, polyvinyl alcohol and galactomannans such as guar and carob gums, but this list is not exclusive.

When the polymeric organic compound is added to a mixture of hydrous sols of the two metals, it is selected to be one which does not react with the mixed sols to produce a precipitate before contacting with the reagent, and which is capable, when mixed with the sols, of forming a gel when contacted with the reagent. Suitable compounds for this purpose are disclosed, for example, in our copending application Ser. No. 145,018 filed May 19, 1971, now U.S. Pat. No. 3,776,987, which is a continuation of Ser. No. 747,800, filed July 26, 1968, now abandoned, and include starch-derived polymers, dextran, polyvinyl alcohol and galactomannans such as guar and carob gum, but this list is not exclusive.

When the polymeric organic compound is added to a mixture of a hydrous sol of one metal and a solution of a salt of the other said metal, it is normally selected as in the case of a mixture of sols, as described in the immediately preceding paragraph.

The process has one application in separating iron, which forms an insoluble hydroxide, from mixtures with such metals as cobalt, nickel and copper, which form soluble ammines when their salts or sols are contacted with ammonium hydroxide. The iron must be in the ferric state, Fe(III), since the ferrous state, FE(II) is soluble in ammonia. For example, by contacting entities, eg drops, of a viscous mixture containing ferric and cobaltous chloride solutions, with ammonia solution, the iron is precipitated in the gelled drops but the cobalt dissolves in the ammonia solution.

The constituents of an alloy may be separated by the process by dissolving the alloy in a suitable acid or acids to produce a mixture of soluble salts of the metals and the organic compound can be added directly to the resulting solution. Components comprising parts made of different metals may be treated similarly.

In an alternative form of the process the reagent means comprises a mixture of two chemical reagents which are contacted simultaneously with the entities, one reagent being capable of precipitating one said metal and the other reagent being capable of dissolving the other said metal. For example by contacting, eg drops, of a viscous mixture containing ferric chloride and nickel nitrate solutions, with reagent means comprising mixed sodium and ammonium hydroxide solutions, the iron is precipitated in the gelled drops by the sodium hydroxide while the nickel is dissolved out by the ammonium hydroxide.

In a modified form of the foregoing process, the two chemical reagents of which the reagent means is comprised are contacted consecutively with the entities, e.g., drops, the first-contacted reagent being capable of precipitating both said metals and the second-contacted reagent being capable of dissolving one of the metals out of the gelled entities formed by contact with the first reagent. For example drops of a viscous mixture containing ferric chloride and nickel nitrate solutions can be contacted first with sodium hydroxide solution, which precipitates both metals in the gelled drops; the latter are subsequently contacted with ammonium hydroxide solution which dissolves the nickel out of the gelled drops.

EXAMPLES OF THE PRESENT PROCESS

Examples of a Single Reagent Acting as Precipitate and Solvent

Example 1

To 50 ml of an aqueous solution of ferric chloride (180g Fe/l) and cobalt chloride (5g Co/l) was added dextran (10g). The resulting Viscous mixture was added dropwise to excess of ammonium hydroxide (15M), and the gel spheres which formed were aged for 45 minutes in the latter. The gel spheres were washed in hot water for one hour and then air-dried. Analyses of the dried gel spheres showed that the amount of cobalt in solution had been reduced by between 50 and 60 percent in the spheres.

A further reduction was achievable by redissolving the spheres in hydrochloric acid, adding more dextran and dropping into ammonium hydroxide.

Example 2

To 20 ml of aqueous solutions of each of three ferric salts (100 g Fe/l) and each of three copper salts (10g Cu/l) was added dextran (4g). The resulting viscous mixtures were added dropwise to an excess of ammonium hydroxide (1.4 l; 15M) circulating in a column. Analysis of the alkaline solution with time showed that there was an efficient and progressive extraction of copper from the gel spheres so formed. The percentage of copper removed depended on the anions present and after 90 minutes was;

a. for copper nitrate with ferric nitrate 69.5 percent,
b. for copper nitrate with ferric chloride 62 percent,
c. for copper chloride with ferric chloride 61 percent and
d. for copper sulphate with ferric sulphate 46.5 percent.

Example 3

Example 2 was repeated, using nickel (10g Ni/l) instead of copper. The extraction was again anion dependent and slightly less efficient than for copper (up to 60 percent in 90 minutes).

Example 4

Example 2 was repeated using cobalt (20g Co/l) instead of copper. The efficiency of extraction was similar to that for nickel (up to 60 percent in 90 minutes).

Example 5

To 150 ml of an aqueous solution of ferric chloride (150g Fe/l) and nickel nitrate (100g Ni/l) was added guar gum (1.5g). The viscous solution was sprayed into an excess of ammonium hydroxide (15M) to form small gel spheres. A more efficient extraction of nickel than in Example 3, in which dextran was added, was obtained.

Example 6

100 ml of an iron sol (Fe : Cl = 1.1, 150g Fe/l) was diluted with an equal volume of copper sulphate solution (100g Cu/l) and to the whole was added carob gum (2g). A 50 ml aliquot of the resulting viscous mixture was added dropwise to an excess of ammonium hydroxide (1l, 15M) to form gel spheres. The alkaline solution rapidly developed a deep blue colour as the copper was extracted as a soluble ammine.

Example 7

Mixtures of nickel salt solutions and iron sols to which dextran, guar gum or carob gum had been added were introduced dropwise into an excess of ammonium hydroxide. As with iron-nickel salt solutions (Example 5) the alkaline solutions rapidly developed a deep purple colour as the nickel was extracted as a soluble ammine.

Example 8

To 100 ml of an aqueous solution of thorium nitrate (100g Th/l) and nickel nitrate (25g Ni/l) was added dextran (15g). The resulting viscous mixture was added dropwise to an excess of ammonium hydroxide (8M) and the gel spheres which formed were aged for 2 hours in the latter. Most of the nickel was extracted from the spheres as a soluble ammine.

Example 9

To 100 ml of an aqueous solution of zirconyl chloride (75g Zr/l) and copper chloride (50g Cu/l) was added dextran (10g). The resulting viscous mixture was added dropwise to an excess of ammonium hydroxide (8M) and the gel spheres which formed were aged for 2 hours in the latter. Most of the copper was extracted from the spheres as a soluble ammine.

Example 10

To 100 ml of an aqueous solution of uranyl nitrate (50g U/l) and nickel nitrate (10g Ni/l) was added guar gum (0.7g). A 50 ml aliquot was added dropwise to an excess of ammonium hydroxide (15M) and the gel spheroids which formed were aged for 2 hours in the base. The alkaline solution developed a purple colouration as the nickel was extracted as a soluble ammine.

Example 11

A 50 ml aliquot of the solution used in Example 10 was added dropwise to an excess of an aqueous pyridine solution (25 percent pyridine) and the gel spheroids which formed were aged for 2 hours in the alkali. The alkaline solution developed a green colouration as the nickel was extracted as a soluble pyridine co-ordination compound.

Example 12

To 100 ml of an aqueous solution of thorium nitrate (50g Th/l) and copper nitrate (10g Cu/l) was added guar gum (0.7g). A 50 ml aliquot was added dropwise to an excess of ammonium hydroxide (15M) and the gel spheres which formed were aged for two hours in the latter. The alkaline solution developed a very deep blue colour as the copper was extracted as a soluble ammine.

Example 13

A 50 ml aliquot of the solution used in Example 12 was added dropwise to an excess of an aqueous pyridine solution (25 percent pyridine) and the gel spheres which formed were aged for 2 hours in the base. The alkaline solution developed a very deep blue colouration as the copper was extracted as a soluble pyridine co-ordination compound.

Example 14

To 100 ml of an aqueous solution of ferric chloride (50g Fe/l) and cobalt chloride (10g Co/l) was added guar gum (0.7g). A 50 ml aliquot was added dropwise to an excess of an aqueous pyridine solution (25 percent pyridine) and the gel spheroids which formed were aged for two hours in the latter. The alkaline solution developed a pink colouration as the cobalt was extracted as a soluble pyridine co-ordination compound.

Example 15

To 100 ml of an aqueous solution of barium nitrate (20g Ba/l) and copper nitrate (20g Cu/l) was added guar gum (0.5g). The resulting viscous mixture was added dropwise to an excess of ammonium sulphide solution and the gel spheres which formed were aged for 2 hours in the latter. A high concentration of barium was found in the sulphide solution.

Example 16

To 100 ml of an aqueous solution of barium nitrate (20g Ba/l) and thorium nitrate (20g Th/l) was added guar gum (0.7g). The resulting viscous mixture was added dropwise to an excess of ammonium hydroxide and the gel spheres which formed were aged for 2 hours in the latter. A high concentration of barium was found in the alkaline solution.

Example 17

To 100 ml of an aqueous solution of ferric chloride (100g Fe/l), chromic chloride (24g Cr/l) and nickel chloride (11g Ni/l) was added guar gum (1g). The resulting viscous mixture was sprayed into an excess of ammonium hydroxide (0.5 l, 15M) to form small gel spheres. The resulting suspension was stirred overnight and then centrifuged. The gel precipitate was washed with water and then air-dried. Analysis of the dry gel precipitate showed that while more than 70 percent of the nickel has been extracted, less than 8 percent of the chromium had been removed. The iron : chromium : nickel ratio in the precipitate was approximately 100 : 22 : 3. The iron concentration in the deep mauve filtrate was less than 0.1 ppm. It will be observed that the mixed salt solution contained the three metals in the same proportions as in 18/8 stainless steel, and that the process enabled most of the relatively expensive nickel to be separated from the less expensive iron and chromium in a single stage.

Examples of Mixed Reagents Acting as Precipitant and Solvent Respectively

Example 18

To 150 ml of an aqueous solution of ferric chloride (150g Fe/l) and nickel nitrate (100g Ni/l) was added dextran (30g). 50 ml aliquots of this viscous mixture were added dropwise into an excess of the following mixed reagents:

a. sodium hydroxide - ammonium hydroxide (50 percent), giving precipitated gel spheres containing iron and a smaller proportion of nickel than the original solution and a deep purple solution of a nickel ammine.

b. sodium hydroxide - diethanolamine (10 percent), giving precipitated gel spheres containing iron and a smaller proportion of nickel than the original solution and a pale green solution of a nickel diethanolamine co-ordination compound.

Example 19

50 ml aliquots of the viscous mixture of iron sol-copper solution with carob gum of Example 6 were added dropwise into an excess of the following mixed reagents;

a. sodium hydroxide-ammonium hydroxide (50 percent), giving precipitated gel spheres containing iron and a smaller proportion of copper than the original solution and a deep blue ammine solution of copper.

b. sodium hydroxide-diethanolamine (15 percent) giving similar results to (a) above.

Examples of Consecutive Precipitant and Solvent

Example 20

A 50 ml aliquot of the iron-nickel solution with dextran which was used in Example 18 was added dropwise to an excess of sodium hydroxide (2M) and the gel spheres which formed were aged for 20 minutes. The gel spheres were rinsed with water before washing in ammonium hydroxide to extract the nickel as a soluble ammine.

Example 21

A 50 ml aliquot of the iron sol-copper solution with carob gum which was used in Example 6 was added dropwise into an excess of dilute sodium hydroxide and the gel spheres aged for 20 minutes. The gel spheres were rinsed with water before washing with either ammonium hydroxide or diethanolamine. In both cases the copper was extracted, as a soluble ammine and a soluble diethanolamine co-ordination compound respectively.

Example 22

To 100 ml of an aqueous solution of thorium nitrate (100g Th/l) and nickel nitrate (25g Ni/l) was added dextran (20g). The viscous solution was added dropwise to an excess of sodium hydroxide and the gel spheres which formed were aged for 30 minutes in the latter. The gel spheres were rinsed with water before standing in an excess of ammonium hydroxide for 2 to 3 hours. The extraction of nickel as a soluble ammine was essentially complete.

Example 23

To 1l of an aqueous solution of ferric chloride (4.6g Fe/l) and uranyl nitrate (6.0 g U/l) was added guar gum (4g). The resulting viscous mixture was added dropwise to an excess of ammonium hydroxide (2 l, 8M), and the gel spheres which formed were aged for 30 minutes in the ammonium hydroxide. After rinsing in cold water the gel spheres were stirred with sodium carbonate (250 ml of a 10 percent solution) for 6 hours to extract the precipitated uranium from the spheres as a soluble carbonate complex leaving the precipitated iron in the spheres. (Longer periods than 6 hours appeared to be without effect.) The gel precipitate was filtered off and rinsed in cold water before being analysed. The iron-to-uranium ratio in the gel precipitate was determined to be greater than 40 to 1, as compared with 0.77 to 1 in the original solution. The iron concentration in the sodium carbonate solution was about 1 ppm.

Example 24

To 100 ml of an aqueous solution of ferric chloride (25g Fe/l) and copper chloride (25g Cu/l) was added guar gum (0.5g). The resulting viscous solution was added dropwise to an excess of sodium hydroxide (1M) and the gel spheres which formed were aged for 30 minutes in the latter. The gel spheres were rinsed with water and divided into two approximately equal portions.

To the first portion was added a 10 percent aqueous solution of glycine (100 ml), which is an amminocarboxylate. On standing, the copper was preferentially extracted as a deep blue soluble glycinate.

To the second portion was added a 10 percent aqueous solution of sodium potassium tartrate (100 ml), which is a carboxylate. On standing, the copper was preferentially extracted as a soluble blue-green tartrate.

It will be understood that combinations of the above forms of the process can be effected. For example in suitable cases a mixture of three metals can be separated by dropping into a solution which precipitates two but dissolves the third, and thereafter contacting the precipitated spheres or gravel with a further solution which dissolves out one of the two precipitated metals.

It will also be understood that the process is not limited to the particular metals, polymeric additives and chemical reagents mentioned in the above Examples. Other metallic salts or sols, other polymeric additives and other chemical reagents which react together in the required manner can be used.

We claim:

1. A process for separating a metal from a mixture including at least one further metal comprising:

forming a viscous mixture of a water-soluble polymeric organic compound with an aqueous medium containing said metals, said metal-containing medium being selected from the group consisting of a mixed solution of salts of said metals, a mixture of hydrous sols of said metals, and a mixture of a solution of a salt of one said metal with a hydrous sol of the other said metal;

forming said viscous mixture into discrete entities of selected physical configuration;

contacting said entities with chemical reagent means capable of precipitating at least one said metal as an insoluble compound whereby each entity is converted to a gel containing said compound;

said reagent means being also capable of dissolving at least one other said metal;

and physically separating said gelled entities from said reagent means.

2. A process as claimed in claim 1 wherein the reagent means comprises a single chemical reagent which is capable both of precipitating one metal and dissolving the other.

3. A process as claimed in claim 1 wherein the reagent means comprises a mixture of two chemical reagents which are contacted simultaneously with the entities, one reagent being capable of precipitating one said metal and the other reagent being capable of dissolving the other said metal.

4. A process as claimed in claim 1 wherein the reagent means comprises two chemical reagents which are contacted consecutively with the entities, the first-contacted reagent being capable of precipitating both said metals and the second-contacted reagent being capable of dissolving one of the metals out of the gelled entities formed by the first-contacted reagent.

5. A process as claimed in claim 1 wherein the aqueous medium contains the metals as a mixed solution of salts of said metals, and wherein the polymeric organic compound has a plurality of hydroxyl groups, is other than a cellulosic derivative which increases in viscosity in the presence of alkaline solution, and forms a complex with at least one of the metal ions in the mixed solution.

6. A process as claimed in claim 5 wherein the compound is selected from the group consisting of dextran, guar gum, carob gum and polyvinyl alcohol.

7. A process as claimed in claim 1 wherein the aqueous medium containing the metals is selected from the group consisting of a mixture of hydrous sols of the metals and a mixture of a solution of a salt of one said metal and a hydrous sol of the other said metal, and wherein the polymeric organic compound is one which does not react with a said sol to produce a precipitate before contacting with the reagent means, and which is capable, when mixed with a said sol, of forming a gel when contacted with the reagent means.

8. A process as claimed in claim 7 wherein the compound is selected from the group consisting of starch-derived polymers, dextran, polyvinyl alcohol, carbon gum and guar gum.

9. A process as claimed in claim 1 wherein the reagent means comprises an alkaline chemical reagent capable of precipitating said one metal as an insoluble compound contained in gelled entities.

10. A process as claimed in claim 1 wherein the reagent means comprises a chemical reagent capable of dissolving said other metal as a soluble ammine or as a soluble co-ordination compound.

11. A process as claimed in claim 10 wherein the chemical reagent capable of dissolving said other metal is ammonium hydroxide.

12. A process as claimed in claim 10 wherein the chemical reagent capable of dissolving said other metal is a carboxylate or amminocarboxylate.

13. A process as claimed in claim 1 wherein the chemical reagent capable of dissolving said other metal is a carbonate.

14. A process as claimed in claim 1 wherein the metal which remains precipitated as an insoluble compound in the gelled entities is iron.

15. A process as claimed in claim 1 wherein the metal dissolved by said reagent means is selected from the group consisting of copper and nickel.

16. A method as claimed in claim 1 wherein the metal dissolved by said reagent means is cobalt.

17. A process as claimed in claim 1 wherein the metal which remains precipitated as an insoluble compound in the gelled entities is selected from the group consisting of thorium, uranium, zirconium and copper.

18. A process as claimed in claim 1 wherein the metal which remains precipitated as an insoluble compound in the gelled entities is thorium.

19. A process as claimed in claim 1 wherein the precipitated metal which is dissolved out of the gelled entities by said reagent means is uranium.

20. A process as claimed in claim 1 wherein the selected physical configuration of the entities is drop-like and the drop-like entities are introduced into the reagent means.

21. A process as claimed in claim 1 wherein the gelled entities are contacted with said chemical reagent means for a prolonged period.

22. A process as claimed in claim 1 comprising the further steps of dissolving said gelled entities to form an aqueous medium and repeating the steps of forming a viscous mixture, forming discrete entities, contacting said entities, and separating as claimed in claim 1.

* * * * *